O. H. MUELLER.
CONDENSER SYSTEM.
APPLICATION FILED APR. 20, 1911.
1,012,268.
Patented Dec. 19, 1911.
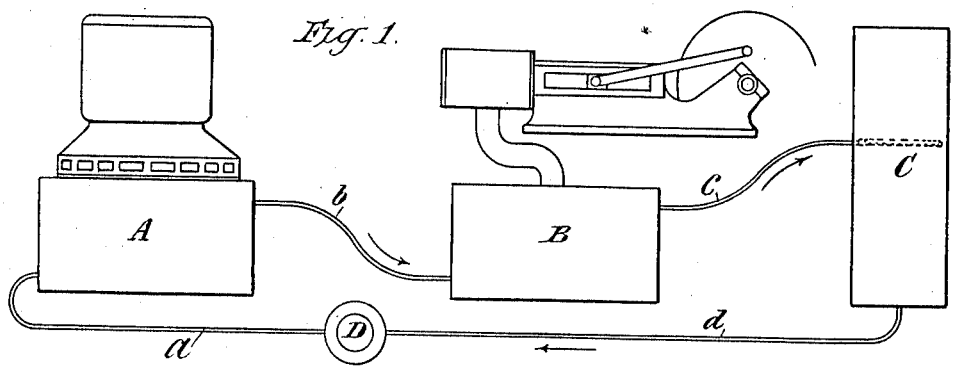
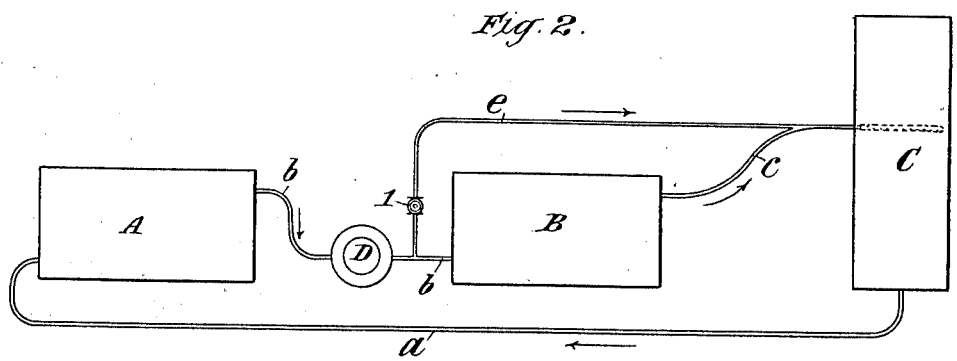
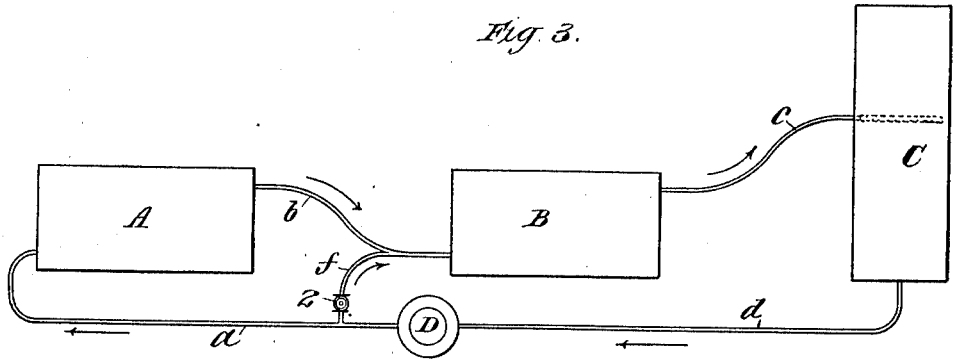

UNITED STATES PATENT OFFICE.

OTTO HILDEBERT MUELLER, OF CAMBERWELL, ENGLAND, ASSIGNOR TO HENRY R. WORTHINGTON, A CORPORATION OF NEW JERSEY.

CONDENSER SYSTEM.

1,012,268.     Specification of Letters Patent.     Patented Dec. 19, 1911.

Application filed April 20, 1911. Serial No. 622,212.

*To all whom it may concern:*

Be it known that I, OTTO HILDEBERT MUELLER, a subject of the Emperor of Germany, residing at Camberwell, England, have invented certain new and useful Improvements in Condenser Systems, fully described and represented in the following specification and the accompanying drawing, forming a part of the same.

The present invention refers in particular to a condenser system for use with turbine engines and reciprocating engines, but the broader features are applicable generally to systems in which condensers operating at different vacua are used in connection with a so-called cooling tower or other cooling apparatus, with the liquid circulated through the whole condenser and cooling system in a closed circuit.

In describing the invention I will take, for example, the case of two condensers, one for a steam turbine and the other for reciprocating engines, the cooling water of both being re-cooled by a cooling tower. For the turbine condenser a high vacuum is required, say $27\frac{1}{4}$ inches, while for the reciprocating engine a vacuum of $25\frac{1}{2}$ inches is quite sufficient, in fact more economical than a higher vacuum. Assuming the water to leave the cooling tower at a temperature of 80° F., such quantity should be circulated as not to raise the temperature of the discharge in the turbine condenser above 102° F., and that in the reciprocating engine condenser not above 124° F. I also assume, for example, that the same quantity of steam is to be condensed in each condenser, with the same quantity of circulating water. The ordinary methods of re-cooling the water for these condensers are three:—

1. Separate cooling towers for the turbine condenser and the condenser for the reciprocating engines, with both towers cooling the water down to 80° F., so that the intake water of both condensers can be taken from the same pipe. The tower for the turbine condenser will have to be very much larger than that of the reciprocating engine condenser, especially if natural draft towers be used, and the combined area of the cooling towers I will call unit.

2. Separate cooling towers, as before, but not cooling the water for the reciprocating engine condenser down from 124° F., to 80° F., but only to 102° F., and circulating through this condenser a correspondingly larger quantity of water. The cooling tower for the reciprocating engine condenser can thus be made considerably smaller, and the combine area of both somewhat less than in case 1 above, or about .9 of unit. As the rise of temperature of cooling water in each condenser is now the same, *i. e.*, 22° F., and the load also the same, as assumed above, the same amount of cooling water would be passed through each condenser and through each cooling tower.

3. One cooling tower to cool the combined discharge of both condensers down to 80° F. The temperature of the combined discharge in the example under consideration would be $$\frac{124 + 102}{2} = 113°\text{F}.$$

It will be found that the area in such cooling tower will be equal to the combined area of the two cooling towers in case 2 above or about .9 of unit.

According to the present invention, the circulating water heated in the turbine condenser will not be pumped to the cooling tower but first be utilized in the condenser for the reciprocating engines and then be delivered to the cooling tower. In the above example the water will flow from the cooling tower to the turbine condenser at 80° F., will be heated up in the turbine condenser to 102° F., then pass through the reciprocating engine condenser, and therein be heated up to 124° F., and then pass to the cooling tower, so that the cooling tower has to deal with water from 124° F., temperature, and it will be found that the area of this cooling tower will be only about .66 of unit. This reduction in area is due largely to the fact that atmospheric cooling towers are much more efficient when working with water at high temperatures, because the cooling air, being heated more highly in passing through the tower, can absorb much more vapor than at lower temperatures and consequently abstracts more heat from the water by evaporation. Another advantage of the higher temperatures in natural draft cooling towers is that the draft is increased by the higher temperature of the ascending air and consequently more air is drawn through the tower and a higher efficiency secured.

In the above description, the load, and consequently the quantity of circulating water, is assumed to be exactly the same on both condensers but the invention is readily applicable also to cases in which the load on the condensers is not the same. If a larger quantity of circulating water be required for the turbine condenser, the arrangement preferably will be such that a portion of the turbine condenser discharge passes directly to the cooling tower, lowering slightly the combined temperatures of the warm water. On the other hand, if a larger quantity of circulating water be required for the reciprocating engine condenser, some of the circulating water may be passed directly to that condenser instead of first passing through the turbine condenser.

In the accompanying drawing forming part of this specification the invention is illustrated diagrammatically as applied in the condenser and cooling tower arrangements described above, in which drawing:—

Figure 1 shows the apparatus with all the circulating water passing through both condensers to the cooling tower. Fig. 2 shows the apparatus with some of the turbine condenser discharge passing directly to the cooling tower, and Fig. 3 shows the apparatus with some of the circulating water passing directly to the reciprocating engine condenser.

Referring to the drawing, A is the turbine condenser, B the reciprocating engine condenser, C the cooling tower, and D the circulating pump delivering through pipe $a$ to the condenser A, from which the discharge water passes through pipe $b$ to condenser B, from which condenser the discharge water passes through pipe $c$ to the cooling tower C and returns from cooling tower C to the circulating pump D through pipe $d$.

The apparatus shown in Fig. 2 is the same as that of Fig. 1, except that a portion of the discharge water from the condenser A, which is not required in condenser B, passes directly from pump D to the cooling tower through pipe $e$, shown as provided with regulating valve 1 by which the amount of water thus by-passed around the condenser B may be adjusted as required.

The apparatus shown in Fig. 3 is the same as that shown in Fig. 1, except that a portion of the circulating water, which is not required in condenser A, passes directly from pump D to condenser B through pipe $f$ provided with regulating valve 2.

It will be understood that the invention may be used with either surface or injection condensers and that the water cooling devices need not be a so-called cooling tower but may be any suitable construction for cooling by air.

What I claim is:—

1. A steam condenser system having a plurality of condensers operating at different vacua and a cooling apparatus for the warm condensing liquid, in combination with means for circulating the condensing liquid through the cooling apparatus and condensers with some or all of the condensing liquid passing successively through the different condensers in the order of decreasing vacua.

2. A steam condenser system having a plurality of condensers operating at different vacua and an atmospheric cooling tower for the warm condensing liquid, in combination with means for circulating the condensing liquid through the cooling apparatus and condensers with some or all of the condensing liquid passing successively through the different condensers in the order of decreasing vacua.

3. In a steam condensing system, the combination with a turbine condenser and a reciprocating engine condenser operating at different vacua and a cooling apparatus for the warm condensing liquid, of means for circulating the condensing liquid through the condensers and cooling apparatus with some or all of the condensing liquid passing from the cooling apparatus first through the turbine condenser and then through the reciprocating engine condenser, and from the reciprocating engine condenser to the cooling apparatus.

In testimony whereof, I have hereunto set my hand, in the presence of two subscribing witnesses.

OTTO HILDEBERT MUELLER.

Witnesses:
 H. D. JAMESON,
 C. P. LIDDON.

---

Copies of this patent may be obtained for five cents each, by addressing the "Commissioner of Patents Washington, D. C."